United States Patent [19]

Shjeflo

[11] 4,062,141
[45] Dec. 13, 1977

[54] DECOY

[76] Inventor: Jelmer B. Shjeflo, 516 N. 23 St., Bismarck, N. Dak. 58501

[21] Appl. No.: 736,148

[22] Filed: Oct. 27, 1976

[51] Int. Cl.² ............................................ A01M 31/06
[52] U.S. Cl. .......................................................... 43/3
[58] Field of Search ................................................ 43/3

[56] References Cited

U.S. PATENT DOCUMENTS

| 512,810 | 1/1894 | Curlin | 43/3 |
| 747,732 | 12/1903 | Kremer | 43/3 |
| 2,483,680 | 10/1949 | Timm et al. | 43/3 |
| 2,564,890 | 8/1951 | Fox | 43/3 |

Primary Examiner—Russell R. Kinsey
Assistant Examiner—Daniel J. Leach
Attorney, Agent, or Firm—Robert E. Kleve

[57] ABSTRACT

The invention comprises a decoy having a head portion with a neck portion therebeneath made of relatively rigid material; a hoop member is attached to the bottom of the neck portion and extends downward therefrom; a spike is at the bottom of the hoop and extends downward therefrom. The spike is adapted to be inserted into the ground. The head and neck portions are shaped to simulate the head and neck of a water fowl. A flexible bag, having a wind sock construction with an opening at the front, is mounted to the hoop with the edges of the bag forming the opening mounted about the hoop. The bag has flared out center portion and a tapered tail portion whereby when the decoy is positioned so that the opening in the bag is facing into the wind, the wind may inflate the bag so that the bag will have the appearance of the body of a water fowl with the flared out center portion giving the appearance of the folded wings of a water fowl and the tapered rearward portion giving the appearance of the tail of a water fowl and the inflating of the bag giving a rounded body shape to the bag similar to the rounded body of a water fowl.

1 Claim, 6 Drawing Figures

DECOY

This invention relates to goose and duck decoys.

It is an object of the invention to provide a novel decoy with a flexible wind sock body construction having a shape when inflated of that of the body of a duck or goose, whereby when the decoy is directed into the wind, the wind will inflate the wind sock body so that it gives the appearance of the body of a duck or goose.

It is another object of the invention to provide a decoy having a head and body portion, with the head portion having the shape of the head of a duck or goose decoy with a spike projecting downward from the head portion for insertion into the ground, and with the hoop mounted to the spike and the body portion having a wind sock construction bag with an opening in the bag mounted about the hoop with the bag, when inflated, giving a round shape similar to the body portion of a duck or goose.

It is another object of the invention to provide a novel decoy having a head and body portion, with the body portion having a flexible wind sock bag construction open at one end which when inflated by the wind entering the opening in the bag causes the bag to take a shape similar to that of the body of the decoy.

Further objects and advantages of the invention will become apparent as the description proceeds and when taken in conjunction with the drawing wherein.

Figure 1:
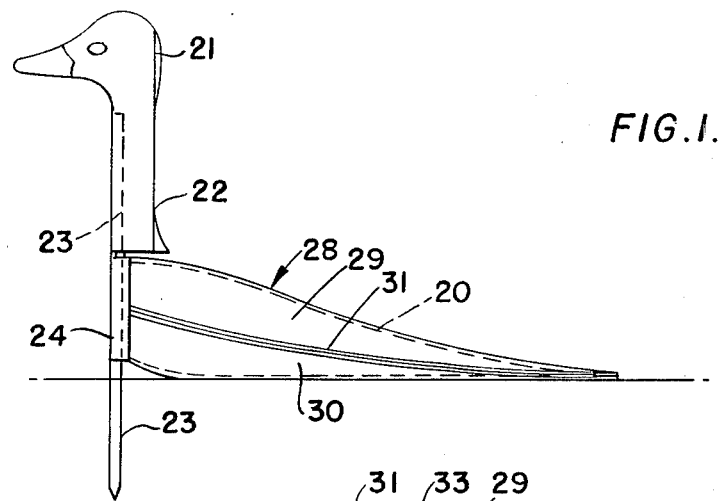
FIG. 1 is a side elevational view of the decoy with the wind sock body portion shown uninflated or collapsed, as it would appear if no wind were traveling into the opening at the front of the decoy.

Briefly stated, the invention comprises a decoy having a relatively rigid head portion with a hoop fixed beneath the head portion and a spike projecting from beneath the hoop portion for insertion into the ground. The decoy also has a body portion made of lightweight flexible fabric in the shape of a wind sock with an opening at one end. The body portion is mounted by the hoop by the edge of the body portion defining the opening attached to and surrounding the hoop portion. The bag when inflated, has flared out side portions and a round appearance of the body of a decoy. The decoy is positioned so that the opening in the bag faces into the wind so that the wind will inflate the body portion to give the body portion the appearance of the body of a decoy, such as a duck or goose.

Referring more particularly to the drawing in FIGS. 1-5, inclusive, the decoy invention is illustrated. The decoy 20 has a simulated head 21 and a neck portion 22 fixed to the head portion. The head and neck portions may be made of relatively rigid material. A metal spike 23 has its upper end 23 fixed into the neck portion and projects downward from the neck portion. A metal loop 24 is pivoted to the spike immediately beneath and the spike projects beneath the hoop so that the lowermost end of the spike 23 can project into the ground 25. The hoop 24 will have bores along its upper and lower edges 24' and 24" to fit the hoop to the spike, as shown, or the hoop may be welded to or otherwise fixed to the spike with the rearward edge 27 of the hoop 24 projecting rearward of the spike.

A flexible bag 28 made of very lightweight nylon or plastic material has an upper panel 29 and a lower panel 30. The panels 29 and 30 are of identical shape. The upper and lower panels may be sewn together about the outer edges 31; or if made of suitable plastic, may be heat sealed together about the outer edges to form an air tight bag closed about its edges except for the opening 32 at its front end. The edges of the bag forming the opening 32 in the bag will be fixed about the metal hoop by the bag edges reversely wrapped or folded about the edges of the hoop and sewn together or otherwise substantially fixed. The metal hoop 24 will be sufficiently rigid in its shape to maintain the opening 32 in its circular open position. The upper and lower panels 29 and 30 have each a widened center portion 33 and 33' and a tail portion 33", so that when the vag is inflated and viewed from above (FIG. 2) the bag's wide center portion gives the appearance of folded wings of a duck or goose and the tail portion 33" gives the appearance of the tail of a duck or goose. When viewed particularly from above and to the side, the inflated shape of the bag also gives the rounded appearance of the body of a duck or goose.

Figure 2:
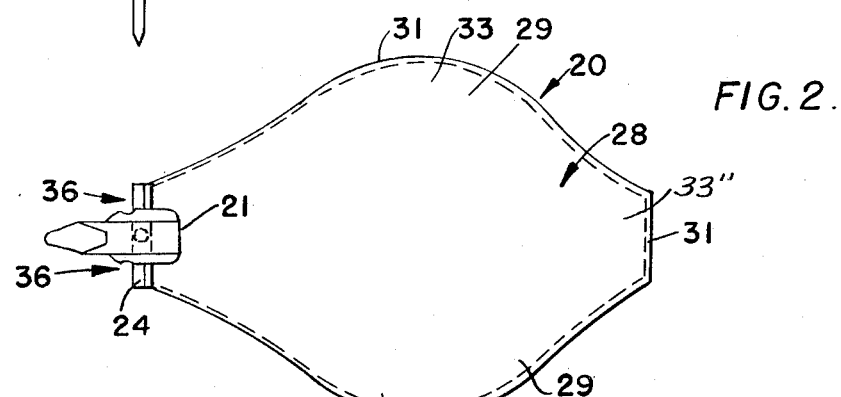
FIG. 2 is a top plan view of the decoy.
Figure 3:
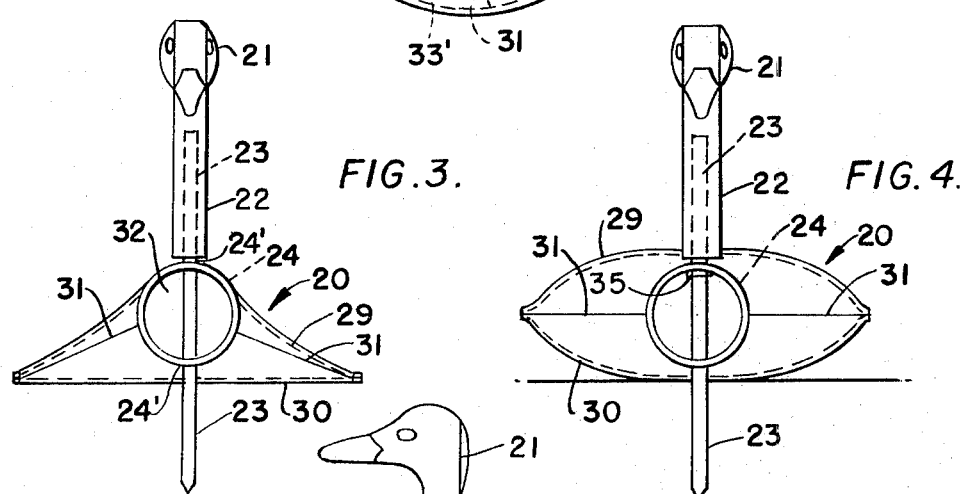
FIG. 3 is a front elevational view of the decoy with the wind sock body portion shown uninflated or collapsed.
Figure 4:
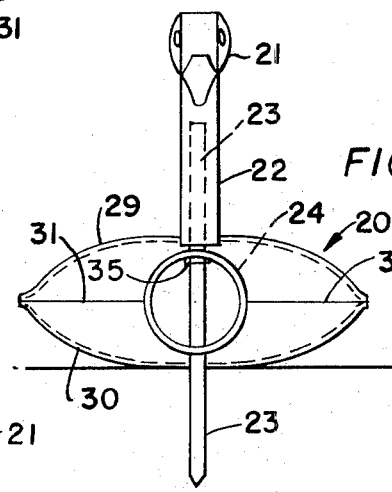
FIG. 4 is a front elevational view of the decoy with the wind sock body portion shown inflated by the wind.
Figure 6:
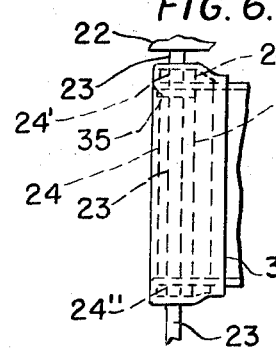
FIG. 6 is an enlarged fragmentary side view of the spike, hoop, and bag attachment or mounting.
Figure 5:
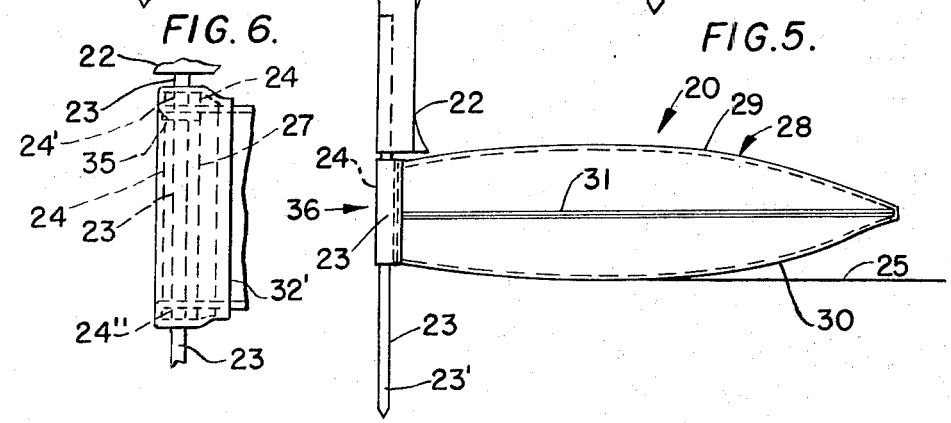
FIG. 5 is a side elevational view of the decoy with a wind sock body portion shown inflated by the wind.

FIG. 2 is intended to illustrate the bag in its inflated condition. However, when viewing the bag from a straight vertical overhead position, such as shown in FIG. 2, the bag whether inflated or not, will have the same general appearance. However, when viewing the bag from any other angle such as the front, or from above and to the side, or from the side, the bag, only when inflated, will also have the rounded appearance of a duck or goose at rest on the ground.

The decoy will be used by hunters by taking it into the field and placing the decoy on the ground with the bag straightened out and with the spike inserted into the ground, and with the head and hoop of the decoy facing into the wind, so that the opening 32 in the bag also faces into the wind to allow any wind, as indicated by the arrows 36, in the vicinity of the bag to enter into the bag through the opening 32 and inflate the bag.

Since the bag is made of very light weight material very little wind, indicated by the arrow 36, is needed to enter into the opening in the bag to inflate the bag so that the bag has its rounded appearance, and so that the body portion as well as the head portion closely simulates the appearance of a duck or goose at rest on the ground with its wings folded.

The decoy can easily be transported from place to place when not in use, since the bag when collapsed, can be simply folded and wrapped about the hoop and spike portion. It takes up relatively little space. The decoy requires no assembling in the field when put into use. The operator needs only to straighten out the bag portion and insert the spike into the ground with the decoy positioned so that the head and opening into the body portion are headed into the wind. If there is any significant amount of wind in the vicinity, the wind will act to inflate the bag to give the bag the rounded appearance of the body of a duck or goose.

The bag may flutter somewhat while inflated by the wind which also gives the appearance of some body movement on the part of the decoy. This gives it a more life-like appearance.

Although the hoop and bag may be fixed to the spike, it is preferred that the hoop and bag can pivot relative to the spike. The forward edges 32' of the bag will be reversely folded about the hoop and the spike will be inserted through bores in the bag and the spike will be inserted through bores in the hoop. The spike 22 will be rounded in the area of the bores so that the bag may pivot relative to the spike, by the hoop and bag rotating on the spike in the bores in the hoop and bag. An enlarged washer 35 larger than the bores will be fixed to the spike immediately beneath the upper portion of the bag and hoop to maintain the bag and hoop from sliding downward on the spike while enabling the hoop and bag to pivot on the spike.

The hoop and bag can pivot relative to the spike so that the bag can be adjusted to changes in the wind by the operator grasping and pivoting the bag so that the opening in the bag faces the wind without having to remove the spike from the ground.

Thus it will be seen that a novel decoy has been provided which may be constructed to have the head and body portion, when inflated, of either a duck or a goose, and when not in use takes up relatively little space in its collapsed condition and which may be rapidly placed in use as a decoy with no assembly, and if there is any significant amount of wind in the area.

It will be obvious that various changes and departures may be made to the invention without departing from the spirit and scope thereof and accordingly it is not intended that the invention be limited to that specifically described in the specification or as illustrated in the drawing but only as set forth in the appended claim wherein:

What is claimed is:

1. A decoy comprising a head portion having a neck portion therebeneath and made of relatively rigid material, a hoop member attached to the bottom of the neck portion and extending downward therefrom, a spike attached to the bottom of the hoop and projecting downward therefrom, said spike being adapted to be inserted into the ground, said head and neck portions simulating the head of a water fowl, a flexible bag having a wind sock construction with an opening at the front end with the edges of the bag adjacent the opening fixed to the hoop to keep and maintain the opening in an open condition, the bag having flared out center portions, a tapered rearward portion, whereby when the decoy is positioned so that the opening in the bag is facing into the wind, the wind will inflate the bag so that the bag will give the appearance of the body of a water fowl with the flared out center portions giving the appearance of the folded wings of the decoy, and the tapered rearward portion giving the appearance of the tail of the water fowl.

* * * * *

REEXAMINATION CERTIFICATE (736th)

United States Patent [19]

Shjeflo

[11] B1 4,062,141
[45] Certificate Issued Aug. 4, 1987

[54] DECOY

[76] Inventor: Jelmer B. Shjeflo, 516 N. 23 St., Bismarck, N. Dak. 58501

Reexamination Request:
No. 90/001,077, Aug. 28, 1986

Reexamination Certificate for:
Patent No.: 4,062,141
Issued: Dec. 13, 1977
Appl. No.: 736,148
Filed: Oct. 27, 1976

[51] Int. Cl.⁴ ............................................. A01M 31/06
[52] U.S. Cl. .................................................... 43/3
[58] Field of Search ...................................... 43/3

[56] References Cited

U.S. PATENT DOCUMENTS 1,401,626 12/1921 Mader .
2,483,680 10/1949 Timm et al. .
3,029,541 4/1962 Palmer .
3,071,892 1/1963 Clark .
4,062,141 12/1977 Shjeflo .

OTHER PUBLICATIONS

The Bird Decoy: An American Art Form, 3-4 (P. Johnsgard, Editor, ed. 1976).
The Duck Hunter's Handbook, 146-47 (1974).
118 Popular Mechanics, 124 (Oct. 1962).
R. Coykendall, Duck Decoys and How to Rig Them, 17,22 (1955).
71 Field & Stream 62 (Oct. 1966).
J. Cartier, Getting the Most Out of Modern Water Fowling, 192-94 (1974).
J. Jones & O. Orr, Paper Bag Goose Decoys, 128 Outdoor Life 139 (Sep. 1963).
U. A. Casal, The Five Sacred Festivals of Ancient Japan, 69-71, (Voyagers' Press, Tokyo, 1967).

*Primary Examiner*—Nicholas P. Godici

[57] ABSTRACT

The invention comprises a decoy having a head portion with a neck portion therebeneath made of relatively rigid material; a hoop member is attached to the bottom of the neck portion and extends downward therefrom; a spike is at the bottom of the hoop and extends downward therefrom. The spike is adapted to be inserted into the ground. The head and neck portions are shaped to simulate the head and neck of a water fowl. A flexible bag, having a wind sock construction with an opening at the front, is mounted to the hoop with the edges of the bag forming the opening mounted about the hoop. The bag has flared out center portion and a tapered tail portion whereby when the decoy is positioned so that the opening in the bag is facing into the wind, the wind may inflate the bag so that the bag will have the appearance of the body of a water fowl with the flared out center portion giving the appearance of the folded wings of a water fowl and the tapered rearward portion giving the appearance of the tail of a water fowl and the inflating of the bag giving a rounded body shape to the bag similar to the rounded body of a water fowl.

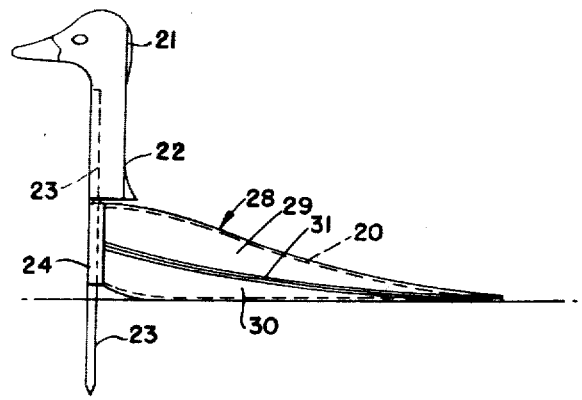

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

* * * * *

REEXAMINATION CERTIFICATE (1400th)
United States Patent [19]
Shjeflo

[11] B2 4,062,141
[45] Certificate Issued     Jan. 8, 1991

[54] DECOY

[75] Inventor: Jelmer B. Shjeflo, Bismarck, N. Dak.

[73] Assignees: Margaret M. Jurgens; George W. Jurgens

Reexamination Request:
No. 90/001,987, Apr. 9, 1990

Reexamination Certificate for:
Patent No.: 4,062,141
Issued: Dec. 13, 1977
Appl. No.: 736,148
Filed: Oct. 27, 1976

Reexamination Certificate B1 4,062,141 issued Aug. 4, 1987.

[51] Int. Cl.$^5$ ............................................. A01M 31/06
[52] U.S. Cl. ................................................. 43/3
[58] Field of Search ........................................ 43/3

[56] References Cited
U.S. PATENT DOCUMENTS
529,463  11/1894  Roberts .
1,579,034  3/1926  Roberts .
3,470,645  10/1969  Mattson .................................... 43/3

OTHER PUBLICATIONS

Clive Hart, Kites—An Historical Survey (Praeger 1967), pp. 61-80, 160-162.
F. M. Feldhaus, *Die Technik der Verzeit, der Geshichtlichen Zeit und der Naturvolker* (Wilhelm Engelmann 1914), cols. 198-199, 650-653.

*Primary Examiner*—Kurt Rowan

[57] ABSTRACT

The invention comprises a decoy having a head portion with a neck portion therebeneath made of relatively rigid material; a hoop member is attached to the bottom of the neck portion and extends downward therefrom; a spike is at the bottom of the hoop and extends downward therefrom. The spike is adapted to be inserted into the ground. The head and neck portions are shaped to simulate the head and neck of a water fowl. A flexible bag, having a wind sock construction with an opening at the front, is mounted to the hoop with the edges of the bag forming the opening mounted about the hoop. The bag has flared out center portion and a tapered tail portion whereby when the decoy is positioned so that the opening in the bag is facing into the wind, the wind may inflate the bag so that the bag will have the appearance of the body of a water fowl with the flared out center portion giving the appearance of the folded wings of a water fowl and the tapered rearward portion giving the appearance of the tail of a water fowl and the inflating of the bag giving a rounded body shape to the bag similar to the rounded body of a water fowl.

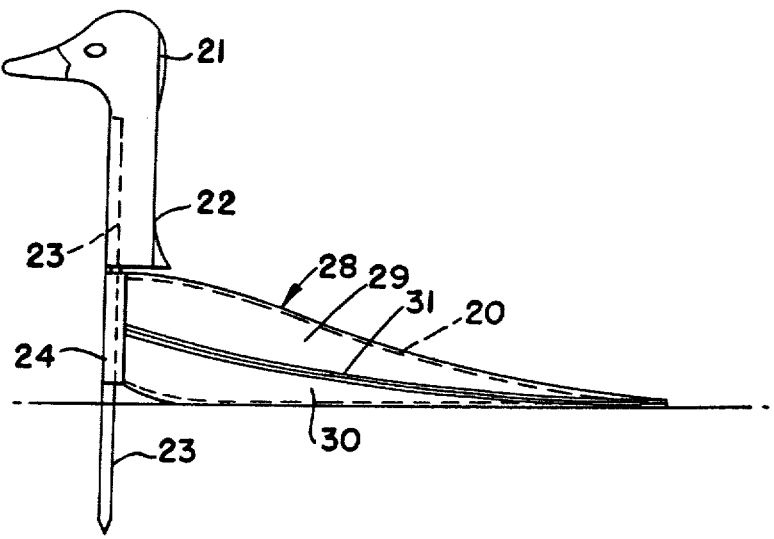

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

* * * * *